United States Patent
Dadebo et al.

(10) Patent No.: US 6,993,403 B1
(45) Date of Patent: Jan. 31, 2006

(54) FACILITY MONITORING METHOD

(75) Inventors: Solomon A. Dadebo, Williamsville, NY (US); Edward Katende, Lockport, NY (US); Frank J. Klein, III, Baton Rouge, LA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 11/085,554

(22) Filed: Mar. 22, 2005

(51) Int. Cl.
  *G06F 19/00* (2006.01)
(52) U.S. Cl. ...................... 700/108; 702/182
(58) Field of Classification Search ........ 700/108–110, 700/266, 270, 271–273; 702/182–186, 83, 702/84
See application file for complete search history.

(56) References Cited

U.S. PATENT DOCUMENTS

| | | | |
|---|---|---|---|
| 4,507,930 A * | 4/1985 | Kaya et al. ................... 62/129 |
| 5,257,206 A | 10/1993 | Hanson ....................... 364/502 |
| 5,315,521 A | 5/1994 | Hanson et al. .............. 364/468 |
| 5,737,581 A * | 4/1998 | Keane ............................ 703/6 |
| 6,173,564 B1 | 1/2001 | Zachary ................... 60/39.091 |
| 6,666,049 B1 | 12/2003 | Katende et al. ............... 62/656 |
| 6,697,713 B2 | 2/2004 | Megan et al. ............... 700/301 |
| 6,735,541 B2 * | 5/2004 | Kern et al. .................... 702/84 |
| 2005/0065863 A1 * | 3/2005 | Plumer et al. ................ 705/30 |
| 2005/0143953 A1 * | 6/2005 | Retsina ....................... 702/182 |
| 2005/0209905 A2 * | 9/2005 | Ness et al. .................... 705/10 |

* cited by examiner

*Primary Examiner*—Zoila Cabrera
(74) *Attorney, Agent, or Firm*—David M. Rosenblum

(57) ABSTRACT

A method of monitoring plant performance within a facility in which having averages of cost contributing items such as raw material usage, product recovery, unit production efficiency, power usage and controller error performance are evaluated, statistically weighted to determine an overall performance factor. The overall performance factor applies an instantaneous indication of plant operation. Excursions of individual performance factors diagnose plant problems.

8 Claims, 2 Drawing Sheets

FACILITY MONITORING METHOD

FIELD OF THE INVENTION

A method of monitoring the performance of a facility in which individual performance factors related to raw material usage, product recovery, the percentage of product recovered, production efficiency and controller tuning are individually monitored as well as an overall plant performance factor that is made up of the individual performance factors.

BACKGROUND OF THE INVENTION

There exists a variety of facilities to process raw materials in one or more unit operations to produce one or more products.

For instance, in a hydrogen-carbon monoxide plant, natural gas is used both as a reactant feed along with steam to a steam methane reformer and as a fuel for burners that support the endothermic steam methane reforming reaction. Steam methane reforming produces a synthesis gas product that contains carbon monoxide, carbon dioxide and hydrogen. In subsequent operations, the synthesis gas is processed by an amine scrubbing unit to remove carbon dioxide. After carbon dioxide removal, carbon monoxide is separated to produce a crude hydrogen stream. Additionally, part of the synthesis gas product from the steam methane reforming is subjected to water gas shift reaction to produce a shifted gas stream that is combined with the crude hydrogen stream and further processed within a pressure swing adsorption unit to produce hydrogen and a purge gas that can be recirculated as part of the fuel to fire the burners of the steam methane reformer. Additionally, some of the shifted gas along with syngas, carbon dioxide and hydrogen can be processed in a methanol plant to make methanol. Some of the methanol can be further processed to make formaldehyde.

In another type of facility, air is separated into oxygen, nitrogen and argon products. In such a facility, the air is compressed, cooled to at or near its dew point and fractionated within the higher and lower pressure columns to produce a nitrogen product and an oxygen product.

In all of such facilities, unit operations are conducted by automated control systems that can set targets for the operations and adjust controls as necessary for the facility to meet the targets. Therefore it becomes necessary for operational staff to have an indication as to the performance of the plant. One way of monitoring the performance of the plant is to monitor the reaction of the plant to control inputs in which targets are set. For instance, in U.S. Pat. No. 6,666,049, a control system utilizes models to determine optimal values of such key performance indictors as plant power consumption, product recovery, controller performance, model predictive controller steady state optimization, model prediction of models utilized by the model predictive controller and model predictive control dynamic performance. Each of these key performance indicators are monitored and operational personnel are alerted when a key performance indicator is outside of a determined expected optimal value range for the specific performance indicator. The system also can suggest one or more actions to the plant operator for adjusting the operation of a cryogenic plant so that a value of a key performance indicator that is outside of the expected range can be brought back into the expected range.

This type of monitoring, while important, does not provide an operator of an instantaneous view of the overall performance of the plant. As will be discussed, the present invention provides a monitoring method that can be applied to any type of facility in which the overall performance of the plant is monitored.

SUMMARY OF THE INVENTION

The present invention provides a method of monitoring performance of a facility having at least one plant producing at least one product and consuming at least one commodity in at least one unit operation. Such a plant could be any type of plant fitting such description, for instance a steam methane reformer or an air separation plant. The term "unit operation" as used herein and in the claims means any industrial process in which a feed is processed to produce a product or intermediate product for further processing.

In accordance with the present invention, current values including a rate of usage of the at least one commodity, a production rate of the at least one product and a unit production cost are monitored. The unit production cost is computed by dividing at least a cost value referable to the rate of usage of at least one commodity by the production rate of the at least one product. Running averages of the rate of usage of the at least one commodity and the unit production cost are computed over a predetermined time interval and stored. Base values are determined. The base values relate to steady state operation of the facility for each of the running averages.

Periodically performance factors are computed that include a commodity performance factor related to the usage of the at least one commodity and a production efficiency performance factor related to the unit production cost. The performance factors are computed with the aid of mathematical functions utilizing the running averages and the base values and defined such that as the usage of the at least one commodity increases, the commodity performance factor and the production efficiency performance factor decrease and as product recovery increases, the production efficiency performance factor increases. An overall performance factor is computed by weighting the performance factors in at least approximate proportions to cost contribution of each of the performance factors to the production of the at least one product. The weighting produces weighted performance factors that are added to produce the overall performance factor which is to be displayed to a user monitoring the performance of the facility.

As can be appreciated from the above discussion, unlike the prior art, the performance factors, as does the overall performance factor, allow the performance of the plant to be monitored on an economic basis. In fact, the overall performance factor is economically weighted by economic contributions to the cost of production. As will be discussed, although not part of the invention, the monitoring, as in the prior art, may include suggestions to the operator for diagnosing problems with the performance of the plant that may have given rise to an out of range performance factor.

As mentioned above, the plant could be a steam methane reformer. In such case, the commodity could be natural gas used as feed and fuel for the reformer, the product would be synthesis gas and the unit cost of production could be stated as the cost of the natural gas necessary to produce a cubic foot of hydrogen. Rather than utilizing direct cost that itself could vary, the cost value could be less direct and be on the basis of high heating value. The price of natural gas is keyed to its high heating value. By the same token, the plant could be an air separation plant designed to produce oxygen as the product. In such case the commodity consumed in the production could be stated as electrical power having a cost basis. The present invention could equally be applied to more complex manufacturing situations that incorporate a series of different unit operations such as those in a hydrogen and carbon monoxide plant.

In a plant such as a steam methane reformer, the at least one commodity can be a raw material and electrical power. Although the economic effect of electrical power is small in such a plant, the use of electrical power produces a more refined overall performance factor and excessive power consumption can help to diagnose problems in rotating equipment such as compressors used in connection with production. In such a plant, the rate of usage of the raw material can be used to determine the commodity performance factor and the production efficiency performance factor. Running averages for the rate of usage of the electrical power are computed and stored and the performance factors can also include an electrical power consumption performance factor. The mathematical functions are also selected such that as the consumption of electrical power increases, the electrical power consumption performance factor decreases.

In plants such as distillation plants and adsorption plants, not all of the desired product in the feed is recovered. In such plants, the product recovery of the at least one product is a fraction of the at least one product produced in the at least one plant. The current values in such case can also include at least one percentile recovery of the at least one product based upon the fraction of the at least one product produced in the at least one plant. Running averages of the percentile recovery of the at least one product are computed and stored. The performance factors also include a percentile recovery performance factor and the mathematical functions are also selected such that as the percentile recovery of the at least one product increases, the percentile recovery performance factor also increases.

In most plants to be monitored, a further refinement can be gained by measuring controller performance. In such case, the current values can also include automated controller performance related to automated controllers utilized in controlling the at least one unit operation. The automated controller performance is computed by summing integral square errors between measured values of process variables to be controlled in the at least one unit process by the automated controllers and target values for the process variables. Running averages for the automated controller performance are also computed and stored and the performance factors also include a controller performance factor. In such case, the mathematical functions are also selected such that as integral square errors are reduced, the controller performance factor increases.

Each of the performance factors can be displayed along with the overall performance factor. Further an indication such as an alarm can be conveyed to the user when at least one of the overall performance factor and at least one of the performance factors deviates from related base values by predetermined amounts.

The mathematical functions used in determining the performance factors are ratios of the base values to the running averages for the electrical power consumption performance factor, the commodity performance factor and the controller performance factor. A percentage production running average to percentage production base value ratio is used for the percentage production performance factor. Further, a difference between a constant and a unit cost running average to a unit cost base value ratio is the mathematical function used in determining the production efficiency performance factor.

As indicated above, the at least one plant can be a hydrogen and carbon monoxide plant having a series of unit operations that produce a hydrogen product stream, a carbon monoxide stream, an export steam stream, and a methanol purge stream. The hydrogen and carbon monoxide plant imports hydrogen as an imported hydrogen stream from another hydrogen and carbon monoxide plant and consumes a natural gas stream both as feed and fuel to a steam methane reformer. In such plant, the raw material can be stated as natural gas of the natural gas stream and the at least one product is hydrogen of the hydrogen product stream. As such, the production rate of the at least one product is a hydrogen flow rate of the hydrogen product stream. The current values include flow rates of the natural gas stream, the methanol purge stream, the imported hydrogen stream, a methanol feed stream consumed within a methanol reactor, the carbon monoxide stream, and the export steam stream. The heat content of the export steam stream is computed. The cost value can be high heating value and related high heating values are computed for the natural gas stream, the methanol purge stream, the imported hydrogen stream, the methanol feed stream and the carbon monoxide stream. The unit production cost is determined by performing an energy balance of the hydrogen and carbon monoxide plant and dividing said energy balance by the hydrogen flow rate of the hydrogen product stream. The energy balance is computed by deriving a first and second sums and subtracting from the first sum, the heat content of the export steam stream and the second sum. The first sum is computed by adding products of the flow rates and the related high heating values of the natural gas stream, the methanol purge stream and the imported hydrogen stream. The second sum is computed by multiplying the flow rates and the related high heating values methanol feed stream and the carbon monoxide stream.

BRIEF DESCRIPTION OF THE DRAWING

While the specification concludes with claims distinctly pointing out the subject matter that applicants regard as their invention, it is believed that the invention will be better understood when taken in connection with the accompanying drawings in which:

DETAILED DESCRIPTION

Figure 1:
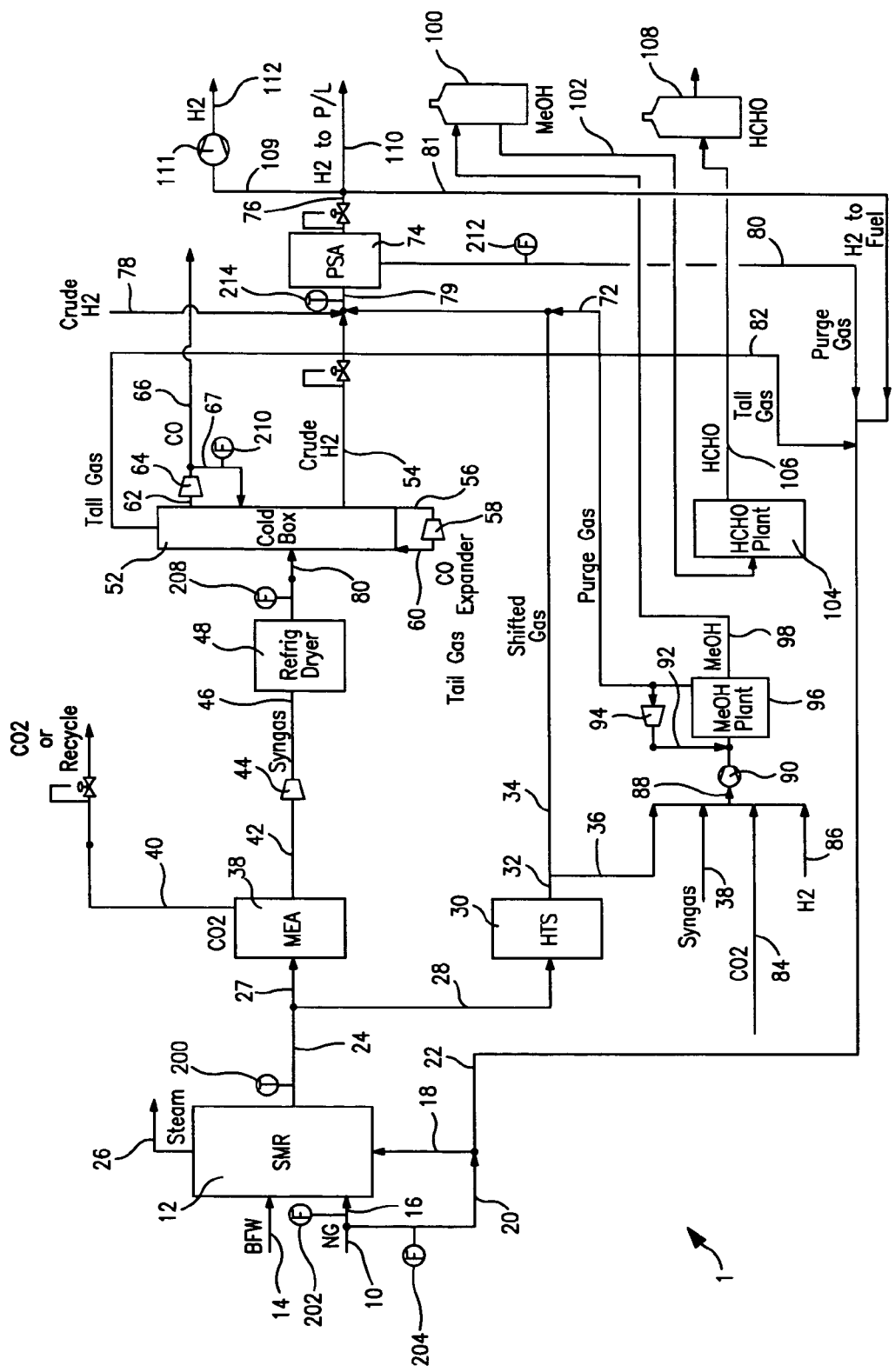
FIG. 1 is a schematic illustration of a hydrogen production plant to be monitored in accordance with the present invention that also produces methanol and formaldehyde products.

With reference to FIG. 1, a process flow diagram is illustrated of a facility containing a plant 1 that is designed to produce hydrogen and carbon monoxide products. Carbon dioxide, methanol and formaldehyde products are also produced. Plant 1 is one of two plants located within the facility. It is understood, however, that as mentioned above the application of the present invention is not limited to any particular type of plant and facility and has more general application.

Plant 1 consists of a series of unit operations that begins with the steam methane reforming of a natural gas stream 10 ("NG") within a conventional steam methane reformer 12 ("SMR"). The steam is conventionally created in a known manner within a convective section of steam methane reformer 12 from a boiler feed water stream 14 ("BFW"). Although not illustrated, steam can also be produced from heat recovery steam generators of the type that would be used in cooling streams, for example, a synthesis gas stream to be subject to a water gas shift reaction. In any event, the steam that is produced, is introduced along with a reactant feed portion 16 of natural gas feed stream 10 into catalyst containing tubes that are located within the steam methane reformer 12. In steam methane reforming, hydrocarbons and steam react within catalyst filled tubes to produce a synthesis gas stream containing hydrogen, carbon monoxide, water vapor and carbon dioxide and unreacted hydrocarbons.

Since steam methane reforming is an endothermic process, heat is added by burners in which a fuel stream 18 is burned. Fuel stream 18 is made up of a subsidiary natural gas stream 20 along with a purge stream 22 that will be discussed hereinafter.

The resulting synthesis gas stream 24, the product of the steam methane reforming, is discharged along with an export steam stream 26. Synthesis gas stream 24 is divided into subsidiary synthesis gas streams 27 and 28 for further processing.

Subsidiary synthesis gas stream 28 is introduced into a water gas shift reactor 30 ("HTS") where additional hydrogen is produced by reducing steam to hydrogen and oxidizing the carbon monoxide to carbon dioxide. This reaction is carried out in a reactor containing a known shift catalyst. The resultant shifted gas stream 32, that is a product of a water gas shift reactor, can be divided into first and second subsidiary shifted gas streams 34 and 36, respectively.

Where a carbon dioxide product is also desired, subsidiary synthesis gas stream 27 can be introduced into an amine scrubbing unit 38 ("MEA") of known design in which the synthesis gas is scrubbed in an absorption column with monoethanolamine. The solvent, which is rich in carbon dioxide, is regenerated in a stripper column with steam to produce purified carbon dioxide which is discharged as a carbon dioxide stream 40.

The subsidiary synthesis gas stream 27, after removal of the carbon dioxide as outlined above, is introduced as a stream 42 into a compressor 44 to produce a compressed stream 46 from which water is removed in a refrigerator/drier unit 48 that contains a chiller to condense out water and an adsorption unit containing molecular sieve adsorbent to remove any remaining water and carbon dioxide. The dried stream, as a cold box feed stream 50 is then introduced into a cold box 52 that can take the form of any of a variety of known designs that by distillation produces a crude hydrogen stream 54, a carbon monoxide product stream 66 and a methane-rich tail gas stream 82. Refrigeration is supplied by expanding a carbon monoxide stream 56 within a turboexpander 58 and returning the expanded stream 60 back into cold box 52.

A carbon monoxide stream 62 is produced that is compressed within a compressor 64 and is discharged as a carbon monoxide product stream 66. Part of the carbon monoxide product stream 66 is reintroduced into cold box 52 as a carbon monoxide compressor recycle flow stream 67 to provide reboiler duty in the particular installation illustrated for plant 1.

The resultant crude hydrogen stream 54 and the subsidiary shifted gas stream 34 are introduced, along with a purge stream 72 to be discussed and optionally an imported crude hydrogen stream 78 as a combined stream 79, into a pressure swing adsorption unit 74 ("PSA") that contains beds of adsorbent operating out of phase to separate hydrogen and thereby to produce a hydrogen stream 76. Adsorbents are employed to preferentially adsorb methane, carbon monoxide and nitrogen and etc. Purge gas stream 22, that serves part of the fuel to steam methane reforming unit 12, is formed of a purge gas stream 80 emanating from PSA unit 74, the methane-rich tail gas stream 82 discharged from the cold box 52, and an optional recycled hydrogen stream 81 obtained from part of hydrogen stream 76.

The subsidiary shifted gas stream 36 is further processed along with a synthesis gas stream 38, a carbon dioxide stream 84, that may constitute all or part of carbon dioxide stream 40 produced by amine scrubbing unit 38 and a crude hydrogen stream 86. These streams are combined to form a methanol feed stream 88 that is compressed within a compressor 90 and introduced along with a recycle gas stream 92 that has been compressed via a compressor 94 into methanol plant 96 ("MEOH"). Methanol plant 96 produces a methanol product stream 98 that can be sent to storage within methanol tank 100 and purge stream 72 containing hydrogen and unreacted carbon dioxide, carbon monoxide, steam and etc.

A methanol process stream 102 may be obtained from storage and further processed within a formaldehyde plant 104 ("HCHO") to produce a formaldehyde product stream 106 that is introduced into a formaldehyde storage tank 108. Formaldehyde plant 104 catalytically oxidizes methanol vapor into formaldehyde, again in a manner known in the art.

Hydrogen product stream 76 can be subdivided into a subsidiary hydrogen product stream 109, recycled hydrogen stream 81 and a further subsidiary hydrogen stream 110 that can be sent to a hydrogen pipeline. Subsidiary hydrogen product stream 109 can be compressed within a compressor 111 and exported as a compressed hydrogen stream 112.

Figure 2:
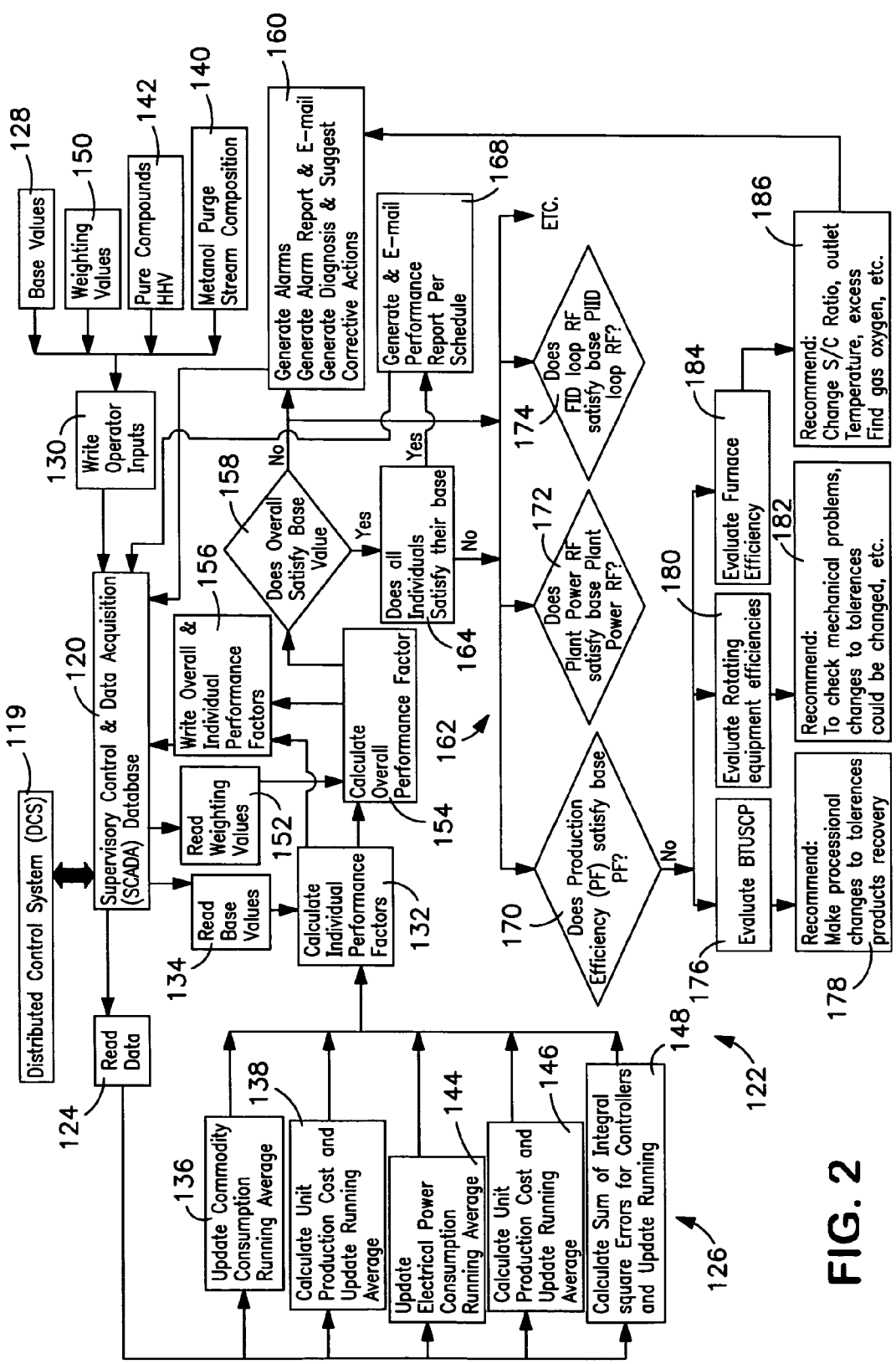
FIG. 2 is a schematic, simplified process flow diagram of an automated system utilized for implementing a monitoring method in accordance with the present invention.

With additional reference to FIG. 2, the overall operation of plant 1 is monitored by a supervisory control and data acquisition system ("SCADA System"). The plant itself is controlled by a Distributed Control System ("DCS"). The DCS sets point or targets that can be operator inputs and/or from a model predictive control system ("MPC System"). The DCS acts on manipulated variables to translate into the setting of valves and other process controls to obtain controlled variables such as temperatures, pressures and flow rates of the various streams discussed hereinabove with respect to plant 1. The SCADA System and the MPC System can be located on two separate computers in which data retrieved from the SCADA System is stored on a SCADA System database 120 which can reside along with the MPC System on a personal computer. Both the DCS and the SCADA System can be obtained from any number of sources well known to those skilled in the art.

A program 122, to be discussed hereinafter, retrieves data from the SCADA System database 120 and calculates specified performance factors, the overall performance factor and diagnostics which are written to the SCADA System database 120 and is displayed to a user monitoring the plant by a graphical user interface provided in the SCADA System. As will become apparent the monitoring of the performance factors and as well as the overall performance factor made up of the performance factors and their display to a user constitute a technical indication of the operation of plant 1 on an economic basis.

The main level of monitoring is to determine an overall performance factor, which a possible embodiment of the present invention, might constitute the sole level in accordance with the present invention for monitoring the plant. As will be discussed in greater detail hereinafter, the overall performance factor is based on specific performance factors. These specific performance factors are: a commodity performance factor; a production efficiency performance factor; a percentile recovery performance factor; an electrical power consumption performance factor; and a controller performance factor. The controller performance factor relates to the performance of the actual controllers that are used to set the valves and other controls of plant 1, which for plant 1 are PID controllers. All other performance factors are at least in part computed on the basis of data related to flow rates of relevant streams illustrated in FIG. 1. All data related to flow rates and controller performance is obtained by the distributed control system 119 and written to SCADA System database 120. Although not illustrated for simplicity of explanation, but as would be known to those skilled in the art, such data related to the flow rates is generated by flow meters, generally of the orifice type.

In general terms, program 122 computes each performance factor by comparing a running average with a base value by a mathematical function that is preferably a ratio and in certain circumstances may use more complex terms. The term "running average" means an average that extends over a particular moving time interval, preferably twelve hours. The program 122 executes every minute, reads data used in calculating the performance factors as indicated in block 124 and then calculates variables as necessary and updates running averages of such variables at 126 by deleting all data that is older than twelve hours and performing an arithmetic average.

The base value for each of the performance factors is the value obtained during steady state operation of the plant, after startup and when the plant is operating in accordance with its design level of operation. As shown in FIG. 2 base values 128 for the commodity consumption performance factor, controller performance factor, the production efficiency performance factor, electrical power consumption performance factor and the percentile recovery performance factor are an input to program 122. The base values 128 are written as operator inputs at 130 onto SCADA System database 120. Such base values may be determined from past plant performance under such steady state conditions. As can be appreciated, base levels that are simply the result of design level calculations or optimal results/correlations from off-line simulations can also be used as an alternative to base levels derived from plant operation.

The running averages computed at 126 are used to calculate individual performance factors as indicated at 132. Base values are read at 134 from the SCADA System database 120 and serve as in input to the calculations at 132.

As indicated above, in its broadest aspect, the present invention encompasses monitoring a plant by computing an overall performance factor on the basis of the commodity performance factor related to the usage of one or more commodities and a product efficiency performance factor related to unit production cost. Turning first to the commodity performance factor, during each execution of program 122, the current value of the usage of the natural gas, that is flow rates of reactant feed portion 16 and subsidiary natural gas stream 20 are read at 124. These flow rates are totaled and used in determining the running average at 136 related to usage of the natural gas. The commodity performance factor is then computed at 132 on the basis of a mathematical function that is simply a ratio of the relevant base value of natural gas usage read at 134 from SCADA System database 120 and divided by the current running average of natural gas usage determined at 136. As such, as the usage of natural gas increases, the commodity performance factor will decrease as will possibly, the overall performance factor.

The production efficiency performance factor is related to unit production cost. As can be appreciated, if a raw material is being consumed and this is the sole cost to consider, then computation of the production efficiency performance factor is simply a mathematical function of the cost of the raw material and the production of the end product. If other salable products are produced, the production of such products could be considered. In case of plant 1 the matter is complicated primarily because the production of other products, the importation of hydrogen from a sister plant and the export of steam must be considered. Thus, the production efficiency is determined in much the same manner as an energy balance in the more complex case as exists for plant 1. The cost value selected is the high heating value in that the cost of natural gas bears a direct relation to the high heating value of natural gas. It is understood, however, that in an appropriate case other costs values could be used such as direct cost.

In the calculation of the production efficiency performance factor, the unit production cost is calculated at block 138 on the basis of data read at 124 from the SCADA System database 120. In this regard, the flow rates of reactant feed portion 16, subsidiary natural gas stream 20 and methanol purge stream 72 are read. Additionally, the current value of the flow rate for imported crude hydrogen stream 78 is also read. Compositions of streams 16, 20, and 78 are known from on-line gas chromatograph analyzers. The composition of stream 72 is updated periodically based on off-line analysis and is an input 140 that is written as an operator input 130 to SCADA System database 120 and then read at 124 for the unit production cost calculation at 138. The energy content of these streams are calculated from their flow rate and composition measurements, and known high heating value of pure compounds present in such streams. The pure compound high heating values 142 are again operator inputs at 130 to SCADA System database 120 that are read at 124 and used in the calculation at 136. The energy contents are then added to produce a sum that is referable to the gross cost of production of the hydrogen. The flow rates related to export steam stream 26, methanol feed stream 88 and carbon monoxide product stream 66 are also read at 124 and used in the calculation at 136. The energy content of export steam stream 26 is calculated from its flow, and enthalpy. The enthalpy of export steam is calculated using its temperature and pressure measurements as input to a known correlation such as ASME steam table. The energy content of methanol feed stream 88 and carbon monoxide product stream 66 are calculated from their flow rates, compositions (on-line gas chromatograph analyzers), and known high heating value of pure compounds present in such streams. The energy contents of export steam, methanol feed stream, and carbon monoxide product stream are added together and the resulting sum is subtracted from the sum of energy contents of inputs described above. The resulting net sum is divided by the flow rate of hydrogen product streams 110 and 109 read again from SCADA System database 120 at 124 to obtain a value related to the unit production cost of the hydrogen product.

Program 122 then utilizes the current value of such unit production cost to maintain a running average that is updated and maintained at 136. The production efficiency performance factor is then calculated at 132 by dividing such running average by the relevant base value read at 134 and subtracting the quotient from a constant, which for plant 1 is selected as 2. Thus, as the unit production costs increase, the production efficiency performance factor will decrease and thus tend to decrease the overall performance factor.

In plant 1, the other commodity being consumed is electrical power. The electrical power commodity is separately used in the computation of the electrical consumption performance factor because it is indicative of the performance of compressors and other electrical power consuming machinery that are utilized in plant 1. Electrical power consumed by plant 1 is measured by GE Multilan Motor Monitor and in Units of Amperes and stored on DCS. It is to be noted, that in a case in which electrical power were the sole commodity that had an economic impact on production of the plant, electrical power could be used to determine the commodity performance factor. In a case in which electrical power was being used along with other commodities, but its usage was constant, it might be neglected in determining a performance factor. Program 122 reads data at 124 from SCADA database 120 that is referable to the current value of electrical power in kilowatts and computes a running average at 144. The electrical power performance factor is then computed at 132 by a mathematical function that is a ratio of the base value referable to electrical power usage as read from SCADA System database 120 at 134 to such running average. As the running average electrical power consumption increases, the electrical power consumption performance factor decreases resulting in a decrease of the overall performance factor.

In plant 1, the products are carbon monoxide and hydrogen that are produced by steam methane reformer 12. Other products such as methanol and formaldehyde are neglected because the synthesis gas feed to the methanol plant is taken as an exported quantity when determining the production efficiency performance factor. The carbon monoxide is produced by distillation within cold box 52 and the hydrogen is in turn produced by purifying crude hydrogen stream 54 in pressure swing adsorption unit 74. As can be appreciated, not all of the carbon monoxide and hydrogen that is produced is recovered. For example, some of the carbon monoxide is present within streams 54 and 82 and some of the hydrogen produced is in purge gas stream 80. This represents a loss of possible production and therefore, a percentile recovery performance factor is computed. To such end, the totals of the hydrogen and carbon monoxide produced by steam methane reformer 12 and shift gas reactor 30 are computed by using composition data obtained from on-line gas chromatograph analyzers. To such end, data representing the flow rates of synthesis gas stream 24 and shifted gas stream 32 are obtained from distributed control system 119 and stored on SCADA System database 120. Composition data for such streams are similarly obtained and stored. The amount of hydrogen and carbon monoxide are computed directly at 146. Data referable to the flow rate of carbon monoxide stream 66 and hydrogen product stream 76 are read from SCDA database 120 at 124 and also serve as an input to the calculations performed at 146. From the calculation of carbon monoxide and hydrogen produced and the flow rate of carbon monoxide product stream 66 and the total flow rate of the hydrogen produced, current percentile recoveries of the carbon monoxide and hydrogen are also computed and then used to update the running average of percentile recovery at 146. This running average is then used as an input at 132 to determine the percentile recovery performance factor by dividing the same by the relevant base value of the percentile product recovery (for example expected design recovery values) read at 134 from SCADA System database 120. As the percentile recovery increases, the overall performance factor will thus tend to increase. It is to be noted that if there were only one product produced, for example, hydrogen, then only the percentile recovery of hydrogen would be considered in such performance factor.

As to the performance factor related to performance of controllers, which in plant 1 are PID controllers, what is measured is the perfection in the tuning of such controllers. A PID controller has proportional, integral and differential constants that must be appropriately set so that target temperatures, flow rates and pressures are obtained in the minimum amount of time. In plant 1, control targets are generated by the MPC System that optimizes production cost by setting manipulated variables to control variables such as temperature and production of products.

With reference again to FIG. 1, in plant 1, the controlled variables relevant to the PID control loops are reformer outlet temperature as controlled by temperature controller 200, flow rates of the reactant feed portion 16 of natural gas feed stream 10 and of subsidiary natural gas stream 18 controlled by flow controllers 202 and 204, the cold box feed stream 50 as measured and controlled by flow controller 208, the carbon monoxide compressor recycle flow stream 67 as measured and controlled by flow controller 210, purge gas stream 80 as measured and controlled by flow controller 212, and the inlet temperature of combined stream 79 to pressure swing adsorption unit 74 as measured and controlled by temperature controller 214.

The temperature controller 200 is a cascade loop that controls the reformer outlet temperature of steam methane reformer 12 by adjusting flow of subsidiary natural gas stream 20. The set point to controller 200 could be an operator input or from the MPC System. The output of this controller 200 establishes the set point for flow controller 204 (subsidiary natural gas stream 20). Once the target is set, the PID controller adjusts a valve (not shown) to keep the flow of subsidiary natural gas stream 20 at set point. Similarly, the flow controller 202 maintains the reactant feed portion 16 of natural gas feed stream 10 at set point that may be an operator input or from MPC system.

The cold box feed stream 50 is controlled by flow controller 208. The set point of this controller 208 is typically from the MPC system. Once the target is set, the PID controller adjusts a valve (not shown) to keep the flow at set point. The carbon monoxide compressor recycle flow stream 67 to the cold box 52 is controlled by flow controller 210. The set point is typically set by MPC and changes only when the carbon monoxide production target is adjusted. Once the target is set, the PID controller adjusts a valve (not shown) to keep the flow rate of the carbon monoxide compressor recycle flow stream 67 at set point.

The flow rate of the purge gas stream 80 is controlled by flow controller 206 which obtains its set point from the purge drum pressure controller (not shown). The flow controller then adjusts a butterfly valve to maintain the flow rate of purge stream 80 at the set point. The temperature controller 214 is set by an operator. Temperature control is achieved by adjusting cooling water flow through a heat exchanger (not shown).

The integral square error is calculated for each of the controllers by measuring the process value to be controlled by a controller, calculating the square of deviation from a set point, and summing over the controller span specified in minutes by the system operator. For example if a PID loop span is 10 minutes and the set point and process value to be controlled are as given below then the integral square error equals 11.25.

|  | Time Period | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Set Point | 100 | 100 | 100 | 100 | 100 | 100 | 100 | 100 | 100 | 100 |
| Process value | 98 | 99 | 99.5 | 100 | 100 | 101 | 98 | 99 | 100 | 100 |
| Error | 2 | 1 | .5 | 0 | 0 | −1 | 2 | 1 | 0 | 0 |
| Error$^2$ | 4 | 1 | 0.25 | 0 | 0 | 1 | 4 | 1 | 0 | 0 |

Integral square error = 4 + 1 + 0.25 + 0 + 0 + 1 + 4 + 1 + 0 + 0 = 11.25

The integral square errors of each of the foregoing controllers are computed as outlined above and are summed at 148. Data representing such errors are recorded on SCADA System database 120 and are read by program 122 at 124 for use in the calculations performed at 148. Once the summation is complete a running average of the same is also updated at 148. For PID loops with set points much greater or less than 1000, the integral square error calculated scaled using the percent of range on the field instrument, i.e. the difference between the hi and lo engineering limits.

Program 122 then calculates the controller performance factor at 132 by dividing the current running average by the relevant base value read at 134 from SCADA System database. In this regard, the relevant base value is divided by the running average to obtain the controller performance factor. Hence, as the actual integral square errors increase, the related performance factor decreases and therefore, the overall performance factor also decreases.

Each of the performance factors mentioned above is then weighted by a predetermined percentile weighting value that are to the economic weight of a particular performance factor in the total cost of production to obtain weighted performance factors as indicated at 150. In this regard, weighting values 150 are an operator input at 130 to SCADA System database 120. Weighting values 150 are read from SCADA System database 120 at and are multiplied by their related performance factors to obtain weighted performance factors that are then added to obtain an overall performance factor at 154. The economic weighting makes the overall performance factor a meaningful value for overall plant performance. For plant 1 the commodity consumption performance factor is given a weight that is twelve times the weight given for either the electrical power consumption performance factor or the controller performance factor and four times the weight of either the percentile product recovery performance factor or the production efficiency performance factor. Hence, natural gas consumption will have the greatest effect on the overall performance factor while controller performance and electrical power consumption will have the least effect.

The predetermined percentile weighting factors are computed on a historical economic basis. As a first step, data is obtained for plant variable cost, sales, productivity and operating profit. The value of PID tuning is determined indirectly by evaluating a change in costs, productivity and operating profit under plant operating conditions in which a defect exists in PID tuning and a state of operation in which PID controllers are tuned. The same indirect method would be used to determine the value of any control system. The value or contribution of each performance factor is then determined and added to calculate the total contribution of the performance factors to variable margin. The percentile weighting factors are then calculating by dividing the value of each contribution relevant to a particular performance factor by the total contribution.

As an example, an increased operating profit of for plant 1 was obtained due to effective PID tuning. It was determined that for every dollar increase in operating profit, 42.5 cents was attributable to a production efficiency improvement and 42.5 cents was attributable to an increase in product recovery (hydrogen and carbon monoxide). Hence, the dollar amount due to improved PID tuning can be inferred to be 15 cents on the dollar. Due to the improved PID tuning, natural gas usage decreased in an amount of roughly $1.80 for every dollar of increased operating profit and power costs decreased by an amount of 15 cents for each dollar of operating profit. The total of the relative contributions on a dollar basis therefore amounted to $2.95 ($1.00 increased operating profit, $1.80 for reduced natural gas usage and 15 cents for reduced power consumption). The percentile weighting factors are then computed. The percentile weighting factor for both the production efficiency performance factor and the product recovery performance factor amounted to 14.4 percent ($0.42.5/$2.95)×100 percent or about 15 percent. The percentile weighting factor for both PID tuning and electrical power usage was 5.08 percent ($0.15/2.95)×100 percent or about 5 percent. The percentile weighting factor for natural gas cost was 61.02 percent ($1.80/$2.95)×100% or about 60 percent.

As can be appreciated from the above discussion, the exact percentile weighting factors can be used or rough approximations can be used by rounding off to the nearest integer. The reason as to why rough approximations can be sufficient is that it is the relative contributions that are important so that the overall performance factor represents a meaningful indictor of the operation of plant 1 and is not inappropriately tilted towards a particular performance factor. Additionally, as indicated above, embodiments of the present invention are possible that do not consider controller efficiency such as the relative economic benefit of PID tuning. In such case, the profits due to sales of the products and the costs could be apportioned to determine the weighting values.

Values for the individual performance factors and the overall performance factor and the individual performance factors making up the overall performance factor can be written to the SCADA System database 120 at 156 and graphically displayed by the graphical user interface of the SCADA System.

In addition to the foregoing, a base overall performance factor is also inputted into program 122 as part of the base values 128 serving as an operator input at 130 to the SCADA System database 120. Deviation of the overall performance factor from the base value thereof is tested at 158. If "no" alarms are generated along with a report and E-mails to remote users at 160 which is in turn written to SCADA System database 120 and displayed via its graphical user interface. Additionally diagnostics are performed and suggested corrective actions are produced at 162. Even if the overall performance factor is satisfied, the individual performance factors are tested at 164. If all are satisfied ("yes"), then a report and E-mails are generated on a scheduled basis at 168 which can be daily, weekly and monthly. The reports and E-mails are written to SCADA System database 120 for display and distribution. If the individual performance factors are not satisfied ("no"), then the diagnostics are performed and etc. at 162 and alarms, reports and etc. are generated at 160. The allowed deviation of either the overall performance factor and each of the individual performance factors from their relative base values is set at preferably 5 percent.

As indicated above, diagnostics and suggested corrective actions to correct the excursion are tested and generated at 162. For instance, assuming that overall performance factor has deviated 5 percent from the base overall performance factor, each of the individual performance factors can be tested as illustrated in FIG. 2, blocks 170, 172 and 174 and etc. With respect to box 170, assuming that the production efficiency performance factor ("PF") does not satisfy the base production efficiency performance factor within 5 percent, as part of the error message, diagnostics for individual evaluation are also sent. For instance, the unit production cost value can be retrieved and evaluated and process control changes may be recommended as indicated at 176 and 178. Rotating equipment efficiencies might not be meeting specification as indicated at 180. In such, a recommendation would indicate to check mechanical problems, limits on expander and compressor flow rates could be changed and etc. as shown at 182. Furnace efficiency is evaluated at 184 and from this changes at 186 are recommended to the steam to carbon ratio, outlet temperature, excess flue gas oxygen and etc.

Although the invention has been described with reference to preferred embodiment, as will occur to those skilled in the art, numerous changes, additions and omissions may be made without departing from the spirit and scope of the present invention.

What is claimed is:

1. A method of monitoring performance of a facility having at least one plant producing at least one product and consuming at least one commodity in at least one unit operation, said method comprising:

periodically monitoring current values including a rate of usage of the at least one commodity, a production rate of the at least one product and a unit production cost computed by dividing at least a cost value referable to the rate of usage of at least one of the at least one commodity by the production rate of the at least one product;

computing and storing running averages over a predetermined time interval of the rate of usage of the at least one commodity and the unit production cost;

determining base values related to steady state operation of the facility for the each of the running averages;

periodically computing performance factors that include a commodity performance factor related to the usage of the at least one commodity and a production efficiency performance factor related to the unit production cost by mathematical functions utilizing the running averages and the base values and defined such that as the usage of the at least one commodity increases, the commodity performance factor and the production efficiency performance factor decrease and as product recovery increases, the production efficiency performance factor increases;

computing an overall performance factor by weighting the performance factors in at least approximate proportions to cost contribution of each of the performance factors to the production of the at least one product to produce weighted performance factors and adding the weighted performance factors; and displaying the overall performance factor to a user monitoring the performance of the facility.

2. The method of claim 1, wherein:

the at least one commodity is a raw material and electrical power;

the rate of usage of the raw material is used to compute the commodity performance factor and the production efficiency performance factor;

the running averages computed and stored are also of the rate of usage of the electrical power; and the performance factors also include an electrical power consumption performance factor and the mathematical functions are also selected such that as the consumption of electrical power increases, the electrical power consumption performance factor decreases.

3. The method of claim 2, wherein:

the product recovery of the at least one product is a fraction of the at least one product produced in the at least one plant;

the current values also include at least one percentile recovery of the at least one product based upon the fraction of the at least one product produced in the at least one plant;

the running averages computed and stored are also of the percentile recovery of the at least one product; and the performance factors also include a percentile recovery performance factor and the mathematical functions are also selected such that as the percentile recovery of the at least one product increases, the percentile recovery performance factor also increases.

4. The method of claim 3, wherein:

the current values also include automated controller performance related to automated controllers utilized in controlling the at least one unit operation, the automated controller performance computed by summing integral square errors between measured values of process variables to be controlled in the at least one unit process by the automated controllers and target values for said process variables;

the running averages computed and stored are also of the automated controller performance; and the performance factors also include a controller performance factor and the mathematical functions are also selected such that as integral square errors are reduced, the controller performance factor increases.

5. The method of claim 4, further comprising displaying each of the performance factors.

6. The method of claim 5, wherein an indication is conveyed to the user when at least one of the overall performance factor and at least one of the performance factors deviates from related base values by predetermined amounts.

7. The method of claim 5 or claim 6, wherein the mathematical functions used in determining the performance factors are ratios of the base values to the running averages for the electrical power consumption performance factor, the commodity performance factor and the controller performance factor, a percentage production running average to percentage production base value ratio for the percentage production performance factor and a difference between a constant and a unit cost running average to a unit cost base value ratio for the production efficiency performance factor.

8. The method of claim 7, wherein the at least one plant comprises a hydrogen and carbon monoxide plant having a series of unit operations that produce a hydrogen product stream, a carbon monoxide stream, an export steam stream, and a methanol purge stream;

the hydrogen and carbon monoxide plant imports hydrogen as an imported hydrogen stream from another hydrogen and carbon monoxide plant and consumes a natural gas stream both as feed and fuel to a steam methane reformer;

the raw material is natural gas of the natural gas stream;

the at least one product is hydrogen of the hydrogen product stream;

the production rate of the at least one product is a hydrogen flow rate of the hydrogen product stream;

the current values include flow rates of the natural gas stream, the methanol purge stream, the imported hydrogen stream, a methanol feed stream consumed within a methanol reactor, the carbon monoxide stream, and the export steam stream;

a heat content of the export steam stream is computed;

the cost value is high heating value and related high heating values are computed for the natural gas stream, the methanol purge stream, the imported hydrogen stream, the methanol feed stream and the carbon monoxide stream; and the unit production cost is determined by performing an energy balance of the hydrogen and carbon monoxide plant and dividing said energy balance by the hydrogen flow rate of the hydrogen product stream, the energy balance computed by deriving a first sum by adding products of the flow rates and the related high heating values of the natural gas stream, the methanol purge stream and the imported hydrogen stream, deriving a second sum by multiplying the flow rates and the related high heating values methanol feed stream and the carbon monoxide stream and then, subtracting from the first sum, the heat content of the export steam stream and the second sum.

* * * * *

UNITED STATES PATENT AND TRADEMARK OFFICE
CERTIFICATE OF CORRECTION

PATENT NO. : 6,993,403 B1 Page 1 of 1
APPLICATION NO. : 11/085554
DATED : January 31, 2006
INVENTOR(S) : Solomon A. Dadebo, Edward Katende and Frank J. Klein, III It is certified that error appears in the above-identified patent and that said Letters Patent is hereby corrected as shown below:

Col. 9, line 25 of the Detailed Description of the patent which reads "SCDA database 120 at 124..." should be replaced with --SCADA database 120 at 124--.

Figure 2 should be modified as follows:

The phrase "Metanol Purge Stream Composition" in box 140 of Figure 2 should be replaced with --Methanol Purge Stream Composition--

"RF" in diamond box 172 of Figure 2 (both occurrences) should be replaced with --PF--

"FID" in diamond box 174 of Figure 2 should be replaced with --PID--

"PIID" in diamond box 174 of Figure 2 should be replaced with --PID-- and

"RF" in diamond box 174 of Figure 2 (both occurences) should be replaced with --PF--

Signed and Sealed this

Third Day of October, 2006

JON W. DUDAS
*Director of the United States Patent and Trademark Office*